(12) United States Patent
Limsico

(10) Patent No.: US 6,662,228 B1
(45) Date of Patent: Dec. 9, 2003

(54) INTERNET SERVER AUTHENTICATION CLIENT

(75) Inventor: Carl T. Limsico, Burlingame, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/495,565

(22) Filed: Feb. 1, 2000

(51) Int. Cl.[7] .............................................. G06F 15/173
(52) U.S. Cl. ....................... 709/225; 709/229; 709/227; 713/201
(58) Field of Search ................................ 709/229, 249, 709/227, 203, 217, 225, 224, 223; 713/201

(56) References Cited

U.S. PATENT DOCUMENTS

| | | | | |
|---|---|---|---|---|
| 5,826,029 A | * | 10/1998 | Gore et al. ................. | 709/227 |
| 5,828,833 A | * | 10/1998 | Belville et al. ............. | 713/201 |
| 5,841,970 A | * | 11/1998 | Tabuki ........................ | 713/201 |
| 5,864,683 A | * | 1/1999 | Boebert et al. ............. | 709/249 |
| 5,960,177 A | * | 9/1999 | Tanno ......................... | 709/229 |
| 5,983,350 A | * | 11/1999 | Minear et al. .............. | 713/201 |
| 6,104,716 A | * | 8/2000 | Crichton et al. ............ | 370/401 |
| 6,119,234 A | * | 9/2000 | Aziz et al. .................. | 713/201 |
| 6,349,336 B1 | * | 2/2002 | Sit et al. ..................... | 709/227 |
| 6,374,298 B2 | * | 4/2002 | Tanno ......................... | 709/227 |
| 6,553,422 B1 | * | 4/2003 | Nelson ........................ | 709/227 |

FOREIGN PATENT DOCUMENTS

GB 2316841 A 4/1998

* cited by examiner

*Primary Examiner*—Ario Etienne
*Assistant Examiner*—Abdullahi E. Salad
(74) *Attorney, Agent, or Firm*—William J. Kubida; Peter J. Meza; Hogan & Hartson LLP

(57) ABSTRACT

A computer network has a subnetwork of computers including a server, a first authentication server, a firewall, and network interconnect. This subnetwork is connected through encrypted protocol handlers and over a potentially insecure channel to a second authentication server. Some authentication requests, especially for users not authenticated in the first authentication server's database and determined by the first authentication server to be authenticatable by the second authentication server, are passed from the server of the subnetwork through the encrypted protocol handlers and over the potentially insecure channel to the second authentication server.

2 Claims, 2 Drawing Sheets

INTERNET SERVER AUTHENTICATION CLIENT

The invention pertains to the field of authenticating and authorizing users accessing a computer system or network of computer systems. In particular, the invention pertains to authenticating and authorizing users by an authentication server referenced by the computer system or network of computer systems with encrypted communications over an insecure channel.

BACKGROUND OF THE INVENTION

The Internet offers tremendous convenience to those who wish to connect computers at widely distributed locations. Full-time and dialup Internet connections are available from service providers in almost all cities of the world for reasonable prices. It is known that a computer or network of computers that is connected to the Internet in a first city can readily communicate with a computer or network of computers in a second city. The cost of maintaining a connection between computers a computer or network of computers in one city, through the Internet to a computer or network of computers in a second city is often cheaper than connecting these computers or networks of computers with leased data lines; and is often less expensive than connecting through modems over dialup telephone lines.

Unencrypted communications over the Internet are not regarded as secure. Internet packets may be routed through facilities including servers, routers, and lines belonging to many different entities. Some entities operating Internet facilities do not have strong security policies. Other entities may be hostile to a given company. Packets transmitted over the Internet are usually routed according to the availability of facilities at the time they are transmitted, making it difficult to ensure that they travel only on secure facilities. It is known that data may be transmitted onto the Internet with fake identification, so connection of a computer to the Internet makes "spoofing" possible if a user identification and password are known or intercepted. The Internet therefore is usually regarded as an insecure channel.

Other insecure communications channels also exist. Virtually any unencrypted or weakly encrypted radio transmissions, including transmissions by wireless modems, analog and digital cellular phones, and satellites, are subject to interception and thus are an insecure communications channel. Data superimposed on power distribution wiring within a home or business forms an insecure channel because these signals can often be intercepted outside the home or business. Even infrared communications are insecure if they are subject to interception through windows. Dialup and leased telecommunications lines may be subject to wiretapping without due process in some countries, and may therefore be an insecure channel. In some areas, fence wire, including barbed wire, has been used for telecommunications, this wire being readily accessible and forming an insecure channel. These insecure channels, however, offer mobility, ready and cheap access, and convenience, there is much temptation to incorporate them into computer networks.

If it is intended that data, including authentication and authorization data, be transmitted between machines securely, without possibility of interception or spoofing, any channel for which any portion is even possibly insecure should be treated as an insecure channel. An insecure channel may therefore have one or a combination of almost any data communications technologies, including Wireless, 10-BaseT, 100-BaseT., CI, Ethernet, Fiberchannel, Token-Ring, T-1, T-3, Microwave, Satellite, DSL, ISDN, Infrared, modems over analog or digital telephone lines whether leased or switched, and others.

Encryption has long been used to provide some security to communications over insecure channels. Encryption machines are known to have been widely used for military communications since the 1930's. It is also known that cryptanalysis of machine-encrypted communications had interesting effects on the Second World War and the early development of computing equipment.

Many computer systems offer a hierarchy of access rights. For example, in the Unix operating system there is a "superuser" or "root" account that has unlimited access— including the rights to create accounts and to set account privileges; this is also true of related operating systems including the Solaris (a trademark or registered trademark of Sun Microsystems, Inc. in the U.S. and other countries) and the Linux operating system. In the Unix operating system there may also be user accounts that can access most system resources, and there may be public accounts restricted to only a few limited resources, like FTP or HTML accounts restricted to reading only files in particular directories.

Authentication is the verifying that a person or machine attempting access to a computer system or network is who what person or machine purports to be. Authorization is the looking up of access rights owned by authenticated persons or machines and application of those access rights to permit access by that person or machine to appropriate system resources. Areas or routines of a server or network that require access rights beyond those granted to all users, including account creation, modification, and deletion routines, may be referred to as privileged areas of the system.

While many computer systems maintain a database of user identification, access rights, and passwords on each system for authentication and authorization, this is inconvenient on networked computer systems, especially on large networks. Many local area computer networks based on the Unix operating system use a network-accessible authentication server to maintain a network-wide database of user identification, access rights, and passwords. The "yellowpages" common with the Unix operating system and Novell NetWare used with many personal computer networks utilize authentication servers to authenticate users and authorize access to resources on a network. These systems, however, often transmit some user identification and authorization information over the network in unencrypted form, thereby inviting attack if this information is transmitted over an insecure channel.

Passwords transmitted over an insecure channel are subject to interception. A prior-art method of authenticating users needing access to network, especially superusers, is use of a challenge-response device. With these devices, such as the Safeword product of Secure Computing Co., a challenge code is transmitted to the user by an authentication server when authentication is desired. The challenge code is processed by the challenge-response device to generate a response according to an algorithm and key known to both the challenge-response device and to the authentication server. Authentication fails if the response received by the system does not match an expected response generated by the authentication server using the same algorithm and key.

Typical challenge-response devices resemble a small calculator, having a keyboard for entry of the challenge, and a display for providing a response for entry to a computer or workstation by their possessor.

Dongles are common hardware devices that attach to computer systems, often being attached to a printer or other I/O port, including a PCMCIA port, of the system. Dongles usually operate by generating a desired response to the computer system when stimulated with a challenge provided from the computer system. They are most often used as a license enforcement device for software, and are typically small and portable such that they may be readily transported by a user or administrator.

There is need for many computer networks to be remotely administered—especially those in smaller companies and branch offices, where it is uneconomical to hire scarce, expensive, trained network administrators full-time. It is known that administration of these networks may be performed by administrators at a main office or by a network administration contractor. Network and system administration typically requires superuser or system administrator privileges on the remotely administered network since user and public accounts must be created and manipulated.

Some existing remotely administered networks are administered by administrators that dial in over a telephone line to a modem attached to a server on that network. Authentication is often achieved through use of a user ID and password, followed by an automated callback by a dialback modem. This method is not convenient because each administrator must have his or her own dialback number, and a database of authorized administrators must be maintained on each remotely administered machine or network. Further, these systems limit dialback to preconfigured numbers, and therefore restrict the locations from which the administrator may call. Need for the dialback may be eliminated with the challenge-response device described above.

When a network is remotely administered, especially when administered by a network administration contractor, it would be convenient if the authentication and authorization database for the administrators were centralized at the network administrator's location. This would permit removal, replacement, and addition of administrators to a single database instead of requiring updating separate databases on each remotely administered network's authentication server.

It is known that allowing users, and especially superusers, unencrypted access to a computer system over an insecure channel like the Internet poses serious risks to the integrity and privacy of data on the computer system. This risk is intensified if authorization and authentication information is transmitted over the insecure channel. Such access offers tremendous convenience to users and administrators at remote locations. It is therefore desirable to provide access, authorization, and authentication through encrypted means.

Firewalls have become standard whenever a network is connected to a larger, insecure, network like the Internet. A firewall is a device, usually a computer with appropriate software, placed between two networks. A firewall then enforces a security policy between the two connected networks. While a firewall is usually a machine, it is often represented as the boundary between the two networks. Typical security policies center on allowing particular kinds of traffic, or on denying particular kinds of traffic between the networks. Firewalls are generally configured to restrict network traffic passing through them to traffic of predetermined types that are not expected to cause problems for the network. Firewalls are intended to be transparent to desired communications while blocking undesired, risky, or otherwise prohibited communications.

The HTTP (HyperText Transfer Protocol) is a common protocol for communicating between machines that typically runs over TCP-IP networks, and is commonly used with the World Wide Web. This protocol provides packaging of information that can contain instruction headers and other data about the content. The HTTPS (HyperText Transfer Protocol Secure) is a secure version of HTTP that uses certificates that identify the communicating machines and provide encryption keys. An HTTPS Server or Client processes communications according to the HTTPS protocol, while invoking encryption/decryption libraries to encrypt communications between the computers or other machines. The HTTPS protocol is used with RSA, DES, and other encryption algorithms.

SUMMARY OF THE INVENTION

An access control system for controlling access to computer systems and networks is provided. In this access control system, a remote authentication and authorization server for some users, including in the preferred embodiment some system and network administrator users, is accessed by the system or network of systems through encrypted communications over an insecure channel such as the Internet. Once authenticated, a user may be permitted to access the system through additional encrypted communications over the same or a different insecure channel.

Users may determined to be permitted to be authenticated by encrypted communications over the insecure channel according to data entered in a local authorization server of the computer system or network, or according to an indicator in a user name of the user.

Authentication by the remote authentication and authorization server is preferably performed through use of a challenge-response device.

DESCRIPTION OF THE PREFERRED EMBODIMENTS

Figure 1:
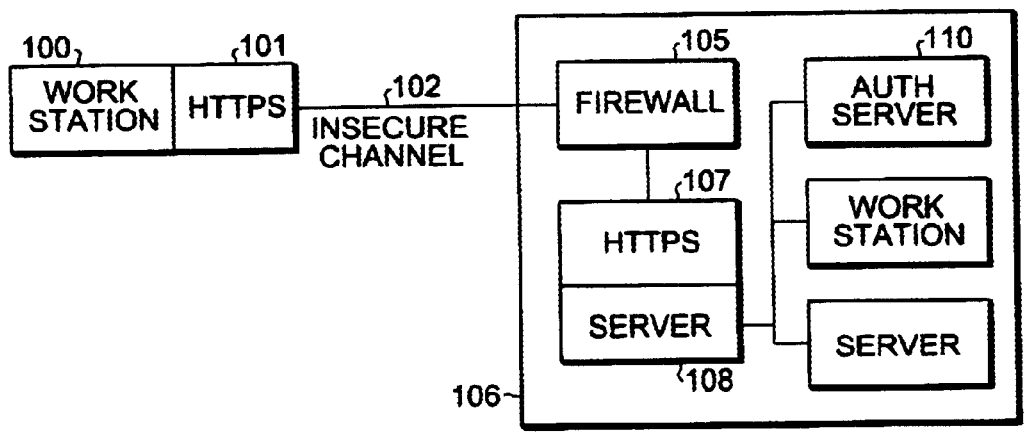
FIG. 1 is a diagram of a prior art computer network that may be administered through encrypted communications over an insecure channel, FIG. 2, a simplified diagram of a computer network embodying the invention, and FIG. 3, a detailed block diagram of the preferred embodiment showing how a computer network of the present invention accesses an encrypted authentication and authorization server over an insecure channel for network administration accesses.

A prior-art remote network administration scheme utilizes an administrator's workstation 100 (FIG. 1). On request by an administrator, this workstation runs an internet browser, such as Netscape Communicator, having the ability to use the HTTPS encrypted secure socket protocol handler 101. This browser establishes a link through the HTTPS protocol handler 101 over an insecure channel 102 through a firewall 105 of the remotely administered network 106 and an HTTPS encryption/decryption and protocol handler module 107 to a login daemon or process of a server 108 of the remotely administered network 106. The workstation may be part of an administrator's network, and the link may be established through a firewall (not shown) of the administrator's network.

It is expected that other encrypting/decrypting modules and protocol handlers than the HTTPS encrypting/ decrypting protocol handler of the preferred embodiment will function. Use of HTTPS encrypting/decrypting protocol handlers is particularly convenient because these are built into available browsers that also serve as terminal software for allowing an administrator to interact with the system. Further, HTTPS keys and certificates are well defined and easily administered.

Once the link is established, the administrator's identity is authenticated and authorizations checked through use of a challenge-response device (not shown) and an authorization and authentication database on an authentication server 110 of the remotely administered network 106.

Figure 2:
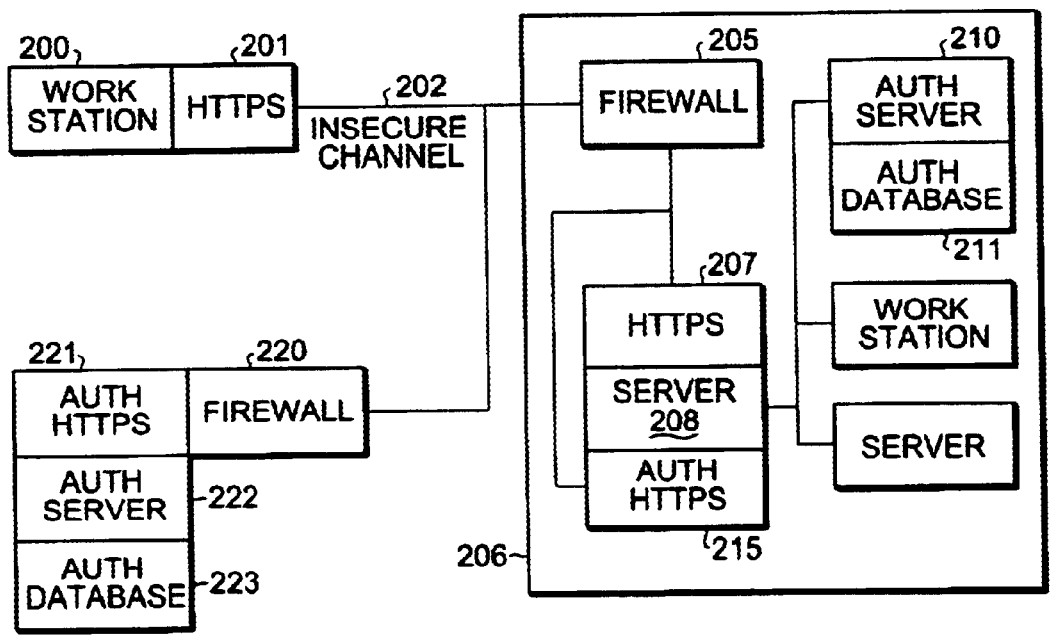

With a remote, encrypted, internet server authorization client embodying the present invention, on request by an administrator (not shown), an administrator's workstation 200 (FIG. 2) runs an internet browser having an HTTPS encrypted secure socket protocol handler 201. This browser establishes a link through the HTTPS protocol handler 201 over an insecure channel 202 through a firewall 205 of the remotely administered network 206 and an HTTPS encryption/decryption and protocol handler module 207 to a login daemon, thread, or process running on a server 208 of the remotely administered network 206.

Once the link is established, an attempt is made to authenticate the administrator's identity through use of a challenge-response device (not shown) and an authorization and authentication database 211 on an authentication server 210 of the remotely administered network 206. This attempt will fail if the administrator is not among the ordinary users of the remotely administered network 206 that are known to the local authorization and authentication database 211. If the attempt succeeds, operation continues as is typical in the art of computer servers and networks.

When authentication has failed on the authentication server 210 of the remotely administered network 206, an authentication inquiry is made by the login daemon, thread, or process through an authentication instance 215 of a HTTPS encrypted secure socket protocol handler where the request is encrypted. The encrypted request is passed through the firewall 205 of the remotely administered network onto an insecure channel 202, which may be the same or a different insecure channel as that used by the browser link to the server 208.

The encrypted request may be passed through a firewall 220, and is decrypted by suitable decryption and encryption hardware or software, illustrated as Authentication Server HTTPS protocol handler 221 to a second authentication server 222, which authenticates the administrator's identity through use of a challenge-response device (not shown) and an authorization and authentication database 223.

The remotely administered network has several workstations and servers interconnected by network communications interconnect of the type known in the art. While the preferred embodiment uses 10-BaseT and 100-BaseT interconnect, it is expected that the present invention will operate on a network having other forms of network interconnect or a mixture of network interconnect including fiber channel, thin Ethernet, thick Ethernet, modems with leased lines, T-1 lines, Token Ring, and others. The remotely administered network can be regarded as a subnetwork of a larger network that also includes the insecure channel 202, the second authentication server 222, and the administrator's workstation 200.

While the present embodiments utilize HTTPS protocol handlers (201, 207, 215, and 221) to perform encryption and decryption together with communications protocol functions. It is expected that other available encryption-decryption and communications hardware or software, may be used to perform these functions. An HTTPS protocol handler is a particular example of an encrypted protocol handler that in a transmit direction encrypts previously unencrypted messages, packages these in packets with in-clear routing information necessary to guide the messages over a network, and sends the packets onto the network. Similarly, in the receive direction an encrypted protocol handler decrypts previously encrypted messages received from a network and sends the decrypted and assembled messages on for further processing.

In an alternative embodiment, when a login attempt is made from the administrator's workstation 200 to the server 208 of the remotely administered network 206, the administrator's user identification is checked for a particular substring of characters as indicator that the administrator is a remotely authenticated user not expected to be found in the local authorization and authentication database 211. If this substring, specifically the characters "RA_" at the beginning of the administrator's user identification, is present, no attempt is made to authenticate this login attempt on the local authentication server 210, the authentication request is passed directly through the HTTPS protocol handlers for encryption and over the potentially insecure channel to the second authentication server 222. It is anticipated that other strings of characters may be used as an indicator of remote authorization and authentication.

In a second alternative embodiment, when a login attempt is made from the administrator's workstation 200 to the server 208 of the remotely administered network 206, the administrator's user identification is first checked in the local authentication server 210. The local authentication server checks the login attempt against its local database, and only if it determines that the login attempt is of a particular class of administrators or other users permitted to be authorized by an external authentication server is the request passed to the second authentication server 222. The particular class of users permitted to be authorized by an external authentication server may be determined by entering a list of externally authenticated users or indicator strings in the database of the local authentication server 210, and the identity of the remote authentication server used to authenticate these users. For example, the database may indicate that users having user names or user identifications beginning with "RA1_" are to be authenticated on a first external authentication server, that those beginning with "RA2_" are to be authenticated on a second external authentication server, and user "RASUN" is to be authenticated on a third external authentication server.

Authentication by the second authentication server 222 is preferably accomplished through transmission of a challenge message through the HTTPS encrypted protocol handers 221 and 215 to the server 208, and thence to the administrator's workstation 200. The administrator enters a response generated by a challenge-response device, which is then transmitted back to the server 208 and thence back through the encrypted protocol handlers 215 and 221 to the authentication server 222 for validation. The challenge-response device may be a stand-alone credit-card-like device having a keyboard and display, it may be a dongle attached to the administrator's workstation 200, or it may be an encryption process run on the administrator's workstation.

Once the administrator, or other user, is authenticated by the second, or remote, authentication server 222, authentication information is passed back through the authentication HTTPS encrypted protocol handlers 221 and 215 to the server 208, thereby allowing the administrator access to the server.

A user authenticated by the second authentication server 222 may request access through the server 208 to areas or routines, such as account creation or deletion routines, of the server 208 or other segments of the remotely administered network 206, that require validation of the user's access rights. When this happens, an authorization request message is passed through the authentication HTTPS encrypted protocol handlers 215 and 221 to the second authentication server 222, the authorization request is checked against the access rights assigned to the user, and an authorization response passed back through the encrypted protocol handlers 221 and 215 back to server 208, which may then use the authorization response in deciding whether to permit access to those areas or routines.

In the preferred embodiment of the invention (FIG. 3), there are two networks, an administrator's network 300 and the remotely administered network 301. The administrator's workstation 302 is part of the administrator's network 300, as is an administrator's authentication server 303. The administrator's authentication server 303 has an authentication database 305 and a challenge generation and expected response verification engine 306 for use with a challenge-response device 307 that is in the possession of an administrator.

When the administrator requests a login to the remotely administered network 301, the administrator's workstation 302 connects through an HTTPS encrypted protocol handler 310 over the network interconnect of the administrator's network, through any firewalls 311 and 312 of the administrators network, any firewall of the remotely administered network 315, an HTTPS encrypted protocol handler 316 of the remotely administered network to a server 317 of the remotely administered network to make a login attempt on server 317. Server 317 then requests authentication of the user from an authentication server 320, which determines that the administrator is not a locally authenticated user, and is a user that may be authenticated by an external server.

A series of authentication request, password verification, and challenge-response device verification messages is then passed through an authentication HTTPS encrypted protocol handler 325 of the remotely administered network 301 through any firewall or other boundary 315 of the remotely administered network 301, over a potentially insecure channel which may incorporate the Internet, and a firewall or other boundary 312 of the administrator's network to an authentication HTTPS encrypted protocol handler 326 of a proxy server 327, that in turn relays these communications through a second firewall 311 of the administrator's network to the remote authentication server 303.

When these authentication request, password verification, and challenge-response device verification messages have confirmed that the administrator is permitted access to the remotely administered network, a series of authorization level messages may be transmitted from server 317 through the authorization encrypted protocol handlers 325 and 326 and proxy server 327 to verify the level of authorization of this administrator by reading information from an authorization database 330.

Figure 3:
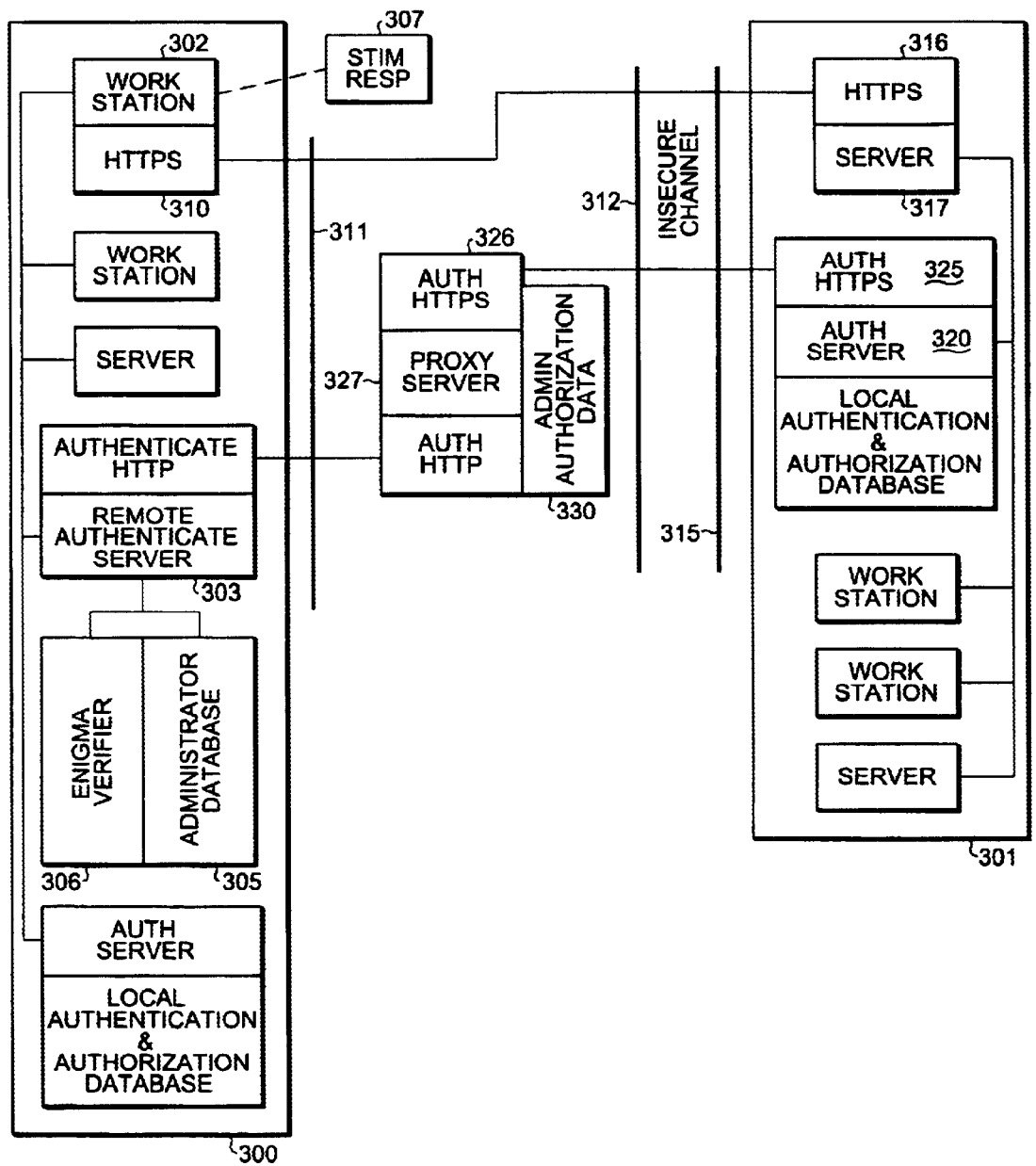

While the remotely administered and administrator's computer networks illustrated in FIG. 3 are networks in their own right, and can operate independently when the insecure channel is not functional, the combination of these networks as interconnected through an insecure channel forms a larger network of computing systems.

While there have been described above the principles of the present invention with specific embodiments thereof, it is to be understood that the foregoing description is made by way of example and not as limitation to the scope of the invention. The foregoing disclosure may suggest other modifications to those persons skilled in the relevant art. For example, the authorization server of the present invention may be utilized for authenticating and authorizing accesses by users, other than administrators, at a location remote from the network being accessed. Further, while the preferred embodiment has the encrypted protocol handlers running in a Solaris operating system environment, it is anticipated that these encrypted protocol handlers can be made operable under other operating systems, including other systems similar to the UNIX operating system and available Microsoft operating systems. Finally, it is anticipated that login attempts may originate from automatic processes in addition to or instead of originating from human users. Such modifications may involve other features which are already known per se and which may be used instead of or in addition to features already described herein.

What is claimed is:

1. A method of authenticating a user and authorizing access to a computer network comprising:

providing an administrator's computer subnetwork comprising a first server, a first firewall associated with the administrator's computer subnetwork, a first encrypted protocol handler, a first authorization server, and network interconnect;

providing a remotely administered computer subnetwork comprising a second encrypted protocol handler, a second firewall associated with the remotely administered computer subnetwork, a second authorization server, and network interconnect;

providing a channel connecting the first firewall to the second firewall;

upon receiving a login attempt to the first server, determining that the login attempt is of type permitted to be authorized by the second authorization server;

passing an authentication request through the first encrypted protocol handler, the first firewall, the second firewall, and the second encrypted protocol handler to the second authorization server; and passing password, challenge and response information between the second authorization server and the first server to authenticate the login attempt, wherein determining that the login attempt is of a type permitted to be authorized by the second authorization server comprises verifying that the user identification of the user is not authorized in a database of the first authorization server.

2. A method of authenticating a user and authorizing access to a computer network comprising:

providing an administrator's computer subnetwork comprising a first server, a first firewall associated with the administrator's computer subnetwork, a first encrypted protocol handler, a first authorization server, and network interconnect;

providing a remotely administered computer subnetwork comprising a second encrypted protocol handler, a second firewall associated with the remotely administered computer subnetwork, a second authorization server, and network interconnect;

providing a channel connecting the first firewall to the second firewall;

upon receiving a login attempt to the first server, determining that the login attempt is of type permitted to be authorized by the second authorization server;

passing an authentication request through the first encrypted protocol handler, the first firewall, the second firewall, and the second encrypted protocol handler to the second authorization server; and passing password, challenge and response information between the second authorization server and the first server to authenticate the login attempt, wherein determining that the login attempt is of a type permitted to be authorized by the second authorization comprises verifying that the user identification of the user is present in a database of externally authenticatable users of the first authorization server.

* * * * *